US012694780B2

(12) United States Patent
Kuhn-Matysiak

(10) Patent No.:  US 12,694,780 B2
(45) Date of Patent:      Jul. 28, 2026

(54) FIRE DETECTOR HAVING UNHEATED THERMISTORS FOR CAPTURING THERMAL FLUCTUATIONS IN THE REGION OF THE INLET OPENINGS

(71) Applicant: Siemens Schweiz AG, Zürich (CH)

(72) Inventor: Ulrich Kuhn-Matysiak, Staufen (DE)

(73) Assignee: SIEMENS SCHWEIZ AG, Zurich (CH)

( * ) Notice: Subject to any disclaimer, the term of this patent is extended or adjusted under 35 U.S.C. 154(b) by 149 days.

(21) Appl. No.: 18/847,990

(22) PCT Filed: Feb. 20, 2023

(86) PCT No.: PCT/EP2023/054216
§ 371 (c)(1),
(2) Date: Sep. 17, 2024

(87) PCT Pub. No.: WO2023/174641
PCT Pub. Date: Sep. 21, 2023

(65) Prior Publication Data
US 2025/0336286 A1      Oct. 30, 2025

(30) Foreign Application Priority Data
Mar. 18, 2022    (EP) .................................... 22163013

(51) Int. Cl.
G08B 29/04        (2006.01)
G01J 5/00         (2022.01)
G08B 17/06        (2006.01)

(52) U.S. Cl.
CPC .......... G08B 29/043 (2013.01); G01J 5/0018 (2013.01); G08B 17/06 (2013.01)

(58) Field of Classification Search
CPC .............................. G08B 29/043; G01J 5/0018
See application file for complete search history.

(56) References Cited

U.S. PATENT DOCUMENTS 5,818,326  A  *  10/1998  Winterble  ..............  G08B 17/10
                                                         340/522
2023/0260390  A1*  8/2023  Wolf  ....................  G08B 29/145
                                                         374/1

FOREIGN PATENT DOCUMENTS

DE        102009000393  A1      8/2010
DE        102016208359  B3      9/2017
(Continued)

OTHER PUBLICATIONS

Search Report for International Application No. PCT/EP2023/054216, 4 pages, May 30, 2023.

*Primary Examiner* — Casey Bryant
(74) *Attorney, Agent, or Firm* — Slayden Grubert Beard PLLC

(57)                ABSTRACT

Some embodiments include a fire detector configured to capture a fire parameter and to output a fire alarm. An example comprises a housing with inlet openings and thermistors, in particular NTCs, arranged in the region of the inlet openings. The fire detector comprises a control unit connected to the thermistors for capturing temperature measurement signals. The control unit is configured for this if the (average) signal bandwidth of signal fluctuations in at least one of the captured temperature measurement signals, or in all the temperature measurement signals, falls below a value of 30 mK, in particular 20 mK, or 15 mK, for a minimum length of time. Reasons for the absence of thermal fluctuations may be contamination in the region of the inlet openings or because the inlet openings are covered by a protective hood or by an adhesive tape.

15 Claims, 4 Drawing Sheets

(56)                    References Cited

FOREIGN PATENT DOCUMENTS

| | | | |
|---|---|---|---|
| DE | 102016208357 | A1 | 11/2017 |
| EP | 1857989 | A1 | 11/2007 |
| EP | 2189956 | A1 | 5/2010 |
| EP | 2330577 | A1 | 6/2011 |
| EP | 2624229 | A1 | 8/2013 |
| EP | 3916691 | A1 | 12/2021 |

* cited by examiner

FIRE DETECTOR HAVING UNHEATED THERMISTORS FOR CAPTURING THERMAL FLUCTUATIONS IN THE REGION OF THE INLET OPENINGS

CROSS-REFERENCE TO RELATED APPLICATIONS

This application is a U.S. National Stage Application of International Application No. PCT/EP2023/054216 filed Feb. 20, 2023, which designates the United States of America, and claims priority to EP Application No. 22163013.0 filed Mar. 18, 2022, the contents of which are hereby incorporated by reference in their entirety.

TECHNICAL FIELD

The present disclosure relates to fire detectors. Various embodiments of the teachings herein include systems and/ methods for detecting fires.

BACKGROUND

An optical smoke detector operates to capture at least one fire parameter in the environment of the fire detector and transmits an alarm in the event of a fire being detected. A typical fire detector has a housing with at least one inlet opening, a sensor system communicating via this inlet with the ambient air for capturing a flow in the region of the sensor system, and a control unit. The control unit is connected to the sensor system for evaluation of the operational capability of the fire detector. Such fire detectors are known for example from EP 1 857 989 A1, from DE 10 2009 000 393 A1, from EP 2 330 577 A1 or from EP 2 189 956 A1.

EP 3 916 691 A1 describes a fire detector for detecting a fire and/or smoke on the basis of a measured variable and/or a measured signal, wherein the fire detector comprises a sensor device for capturing the measured variable and for outputting the measured signal, wherein the measured signal has a noise and/or scatter. The fire detector comprises an evaluation unit, configured to capture the measured signal for an evaluation time interval, to perform a time series analysis of the measured signal in the evaluation time interval, and on the basis of the time series analysis to determine contamination and/or operational readiness of the fire detector.

EP 2 624 229 A1 describes a fire detector having a housing with a measuring chamber for detecting smoke particles. The fire detector has a flow sensor for detecting a flow as a measured variable for the evaluation of the operational capability of the fire detector and a suitable evaluation device based thereon. In a design embodiment preferred therein, the flow sensor is configured as a hot-wire flow sensor, the functional principle of which is based on the fact that a hot wire cools down due to the flow. In this case the degree of cooling is a function of the flow velocity and the air temperature

SUMMARY

Teachings of the present disclosure include improved fire detector systems and methods. Some embodiments include a fire detector which has an energy-saving sensor system. For example, some embodiments include a fire detector for capturing at least one fire parameter and for outputting a fire alarm (AL) if a fire is detected, wherein the fire detector (M)

has a housing (G) having at least one inlet opening (OF), a sensor system communicating via this with the ambient air for capturing a flow in the region of the sensor system, and a control unit (MC), wherein the control unit (MC) is connected to the sensor system for evaluation of the operational capability of the fire detector (M), characterized in that the sensor system has at least one thermistor (T1-T4), in particular at least one NTC, arranged in the region of at least one of the inlet openings (OF), the control unit (MC) is connected to the at least one thermistor (T1-T4) for capturing a respective temperature measurement signal (S1-S4), and the control unit (MC) is configured to output a warning message (WM) if the signal bandwidth of signal fluctuations of at least one of the captured temperature measurement signals (S1-S4), of all the temperature measurement signals (S1-S4), falls below a value of 30 mK, 20 mK, or 15 mK, for a minimum length of time (MZ).

In some embodiments, the minimum time lies in a range of between 1 day and 1 year, in particular in a range of between 1 day and 1 month, or in a range of between 1 day and 1 week.

In some embodiments, the control unit (MC) is configured to continuously convert the respective temperature measurement signal (S1-S4) into a respective digital temperature measurement signal (D1-D4) by means of an A/D converter (ADC) with a specified sampling interval AP, in particular with a sampling interval AP in a range of between 0.1 and 10 seconds, or in a range of between 0.5 and 2 seconds.

In some embodiments, the control unit (MC) is configured to filter the respective captured temperature measurement signal (S1-S4, D1-D4) initially by means of a high-pass filter (HP) and then to detect the signal fluctuations in the respective temperature measurement signal (S1-S4, D1-D4).

In some embodiments, the control unit (MC) is configured to filter the respective captured temperature measurement signal (S1-S4, D1-D4) initially by means of a high-pass filter (HP), to filter a high-pass filter signal ($F_{H1}$-$F_{H4}$) output by the respective high-pass filter (HP) by means of a low-pass filter (TP) with a filter time (FZ) in the range of between 1 and 120 minutes, preferably of between 15 and 60 minutes, and to output this as a respective filter output signal ($F_{O1}$-$F_{O4}$), and wherein the control unit (MC) is configured to output the warning message (WM) if the absolute value of at least one of all the filter output signals ($F_{O1}$-$F_{O4}$), falls below a specified limit value (GW) of 5 mK, in particular 3 mK, or 1.5 mK for a minimum length of time (MZ), instead of the signal bandwidth of the signal fluctuations in the respective temperature measurement signal (T1-T4).

In some embodiments, the control unit (MC) is configured to filter the respective captured temperature measurement signal (S1-S4, D1-D4) initially by means of a high-pass filter (HP), to filter a high-pass filter signal ($F_{H1}$-$F_{H4}$) output by the respective high-pass filter by means of a moving mean value filter, in particular by means of a moving mean square or mean arithmetic value filter (RMS, AVS), with a specified filter time (FZ) in the range of between 1 and 120 minutes, or of between 15 and 60 minutes, and to output it as a respective filter output signal ($F_{O1}$-$F_{O4}$), and wherein the control unit (MC) is configured to output the warning message (WM) if the absolute value of at least one, preferably of all the filter output signals ($F_{O1}$-$F_{O4}$), falls below a specified limit value (GW) of 5 mK, in particular 3 mK, or 1.5 mK for a minimum length of time (MZ), instead of the average signal bandwidth of the signal fluctuations in the respective temperature measurement signal (T1-T4).

In some embodiments, the specified limit value (GW) is set in a range of between 1.5 and 10 times, in particular between 1.5 and 5 times, of a reference value that was metrologically determined on a new, like-new or refurbished, in particular brand-new fire detector (M), in a flow-free test environment.

In some embodiments, the control unit (MC) is configured to continuously convert the respective temperature measurement signal (S1-S4) into the respective oversampled digital temperature measurement signal (D1-D4) by means of the A/D converter (ADC) using a number OVS of oversamplings in a range of between 2 and 4096, in particular with a number OVS of 64, 256 or 1024.

In some embodiments, the control unit (MC) is configured to control the respective thermistor (T1-T4) such that it heats up by less than 0.5 mK, in particular by less than 0.1 mK, per measured value captured, and/or that it takes up a maximum electrical energy of 10 µJ, in particular of 5 µJ, or of 0.5 µJ, per measured value captured.

In some embodiments, the respective thermistor (T1-T4) has a maximum thermal response time of 3 s, in particular of 2 s, or of 1 s.

In some embodiments, a fire detection unit (MK), in particular an optical measurement chamber, communicating with the ambient air via the at least one inlet opening (OF), for capturing the at least one fire parameter is accommodated or configured in the housing (G), wherein a grille (N), in particular an insect protection grille, is arranged in the region of the respective inlet opening (OF) and the fire detection unit (MK), and wherein the grille (N) is arranged between the at least one thermistor (T1-T4) and the fire detection unit (MK) in the region of the respective inlet opening (OF), or wherein the at least one thermistor (T1-T4) is arranged between the grille (N) and the fire detection unit (MK) in the region of the respective inlet opening (OF).

In some embodiments, the control unit (MC) is configured to start an operating timer (BZM) of the fire detector (M) when the electrical power supply of the fire detector (M) commences, wherein the control unit (MC) is configured to output a Covered message (COV), or the warning message (WM) together with a Covered message (COV), as an indicator that the at least one inlet opening (OF) is impermissibly covered, if the signal bandwidth of signal fluctuations of at least one of the captured temperature measurement signals (S1-S4), or of all the temperature measurement signals (S1-S4), falls below a value of 30 mK, in particular 20 mK, or 15 mK, in a range of between 1 hour and 3 days, or of between 1 hour and 24 hours, for a minimum waiting time (WZ), and if furthermore an operating life measured value (BZW) of the operating timer (BZM) is less than 2 years, or less than 1 year.

In some embodiments, the control unit (MC) is configured to output the warning message (WM) and/or the Covered message (COV) optically and/or acoustically directly at the fire detector (M) and/or to a higher-level control panel connected to the fire detector (M) and/or wirelessly to a higher-level control panel via a radio connection.

In some embodiments, the control unit (MC) is configured to monitor the respective temperature measurement signal (S1-S4, D1-D4) for exceeding an excess temperature limit value of in particular 54° C. and/or for exceeding a rate of temperature increase of in particular 5° C. per minute, or of 10° C. per minute, as fire parameters and if a fire is detected to output a fire alarm (AL).

As another example, some embodiments include a method for detecting contamination or whether at least one inlet opening (OF) for smoke or combustion gas in a fire detector (M) is being impermissibly covered, wherein at least one unheated thermistor (T1-T4) is arranged in the region of one of the inlet openings (OF), wherein a temperature measurement signal (S1-S4) is captured by the respective thermistor (T1-T4), and wherein a warning message (WM) is output for the absence of moving ambient air around the at least one thermistor (T1-T4) if the signal bandwidth of signal fluctuations of at least one of the captured temperature measurement signals (S1-S4), or of all the temperature measurement signals (S1-S4), falls below a value of 30 mK, in particular 20 mK, or 15 mK, for a minimum length of time (MZ).

BRIEF DESCRIPTION OF THE DRAWINGS

The teachings of the present disclosure and advantageous embodiments of the teachings herein are explained using the example of the following figures, in which.

DETAILED DESCRIPTION

Figure 1:
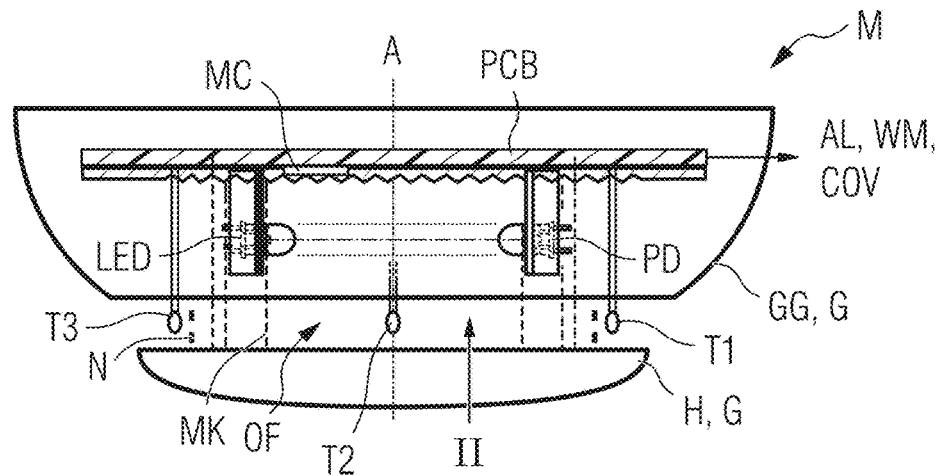
FIG. 1 shows an example fire detector incorporating teachings of the present disclosure with four thermistors arranged in a distributed manner in the region of the inlet opening.

In various embodiments of the teachings herein, a sensor system has at least one thermistor arranged in the region of at least one of the inlet openings. A thermistor is a passive component with a temperature-dependent ohmic resistance value. In some embodiments, the thermistor comprises an NTC (Negative Temperature Coefficient) thermistor or a PTC (Positive Temperature Coefficient) thermistor, i.e. a thermistor with a negative or positive temperature coefficient. The control unit is connected to the at least one thermistor for the (exclusive) capture of a respective temperature measurement signal. A thermistor is thus a special temperature sensor.

The control unit is configured to output a warning message if the signal bandwidth of signal fluctuations of at least one of the captured temperature measurement signals, or of all the temperature measurement signals, falls below a value of 30 mK, in particular 20 mK, or 15 mK, for a minimum length of time. In this case at least 90% of the captured signal fluctuations, or at least 95% of the captured signal fluctuations, fall within this signal bandwidth. In other words, the control unit is configured to output a warning message if the AC component, i.e. the signal component decoupled from the DC component, of at least one of the captured temperature measurement signals, preferably of all the temperature measurement signals, has a value of less than 30 mK, in particular less than 20 mK, or less than 15 mK, for a minimum length of time.

The minimum time lies in a range of between 1 day and 1 year, in particular in a range of between 1 day and 1 month, or in a range of between 1 day and 1 week. To detect the expiration of the minimum time, the fire detector can have a timer. The timer can be an electronic counter function block. This can be already integrated into the control unit. In some embodiments, the timer can also be implemented as software that is executed on a processor-based control unit, e.g. on a microcontroller. The control unit is in this case configured to set the counter reading of the timer initially to a counter start value, which the timer counts down continuously, corresponding to the minimum time. The control unit then outputs the warning message when the timer reaches the counter value zero. If signal fluctuations are detected by the control unit beforehand, the timer is reset to the counter start value.

The warning message is output for the absence of moving ambient air around the at least one thermistor. The signal fluctuations in this case originate from thermal fluctuations in the ambient air which directly surrounds or flows around the respective thermistor. The absence of moving ambient air is in this case an indicator of the presence of contamination in the region of the inlet openings or an indicator of the inlet openings being impermissibly covered by a protective hood or adhesive tape. In this case the fire detector is no longer operational. The warning message is thus a message relating to the non-operability of the fire detector.

The teachings of the present disclosure include the use of purely passively operated, unheated thermistors for the metrological capture of very small signal fluctuations in the respective temperature measurement signal due to thermal fluctuations that are almost always present in the environment of the fire detector. If such thermal fluctuations can be detected in the region of the inlet openings, this is a (reliable) indicator that the inlet openings are sufficiently permeable for fire detection. At the least, if fluctuations are present the inlet openings are not completely contaminated or blocked or intentionally covered or taped over. The latter is often the case if, due to painting work, the fire detector is intentionally covered by a protective hood to prevent the fire detector from being painted accidentally. Often the inlet openings are also taped over with masking tape or covered with a rubber glove if such a protective hood is not available.

Thus it has been shown in metrological studies that thermal fluctuations, i.e. fluctuations in the flow, are not entirely homogeneous as regards their temperature distribution. It has also been found that the (average) signal bandwidth of signal fluctuations, which resemble a smoke signal, in the respective temperature measurement signal is, in the region around 15 mK, typically already many times larger than the purely thermal noise of the thermistor itself. The detection of the very small temperature changes in this case originates from minimum heat inputs into the thermistors or from minimum heat dissipation from the thermistors. Since the respective thermistor is not heated, there is also no cooling effect that a thermal fluctuation or a fluctuation in the flow would cause in an otherwise heated flow sensor. The level of the cooling effect would then be a measure of the velocity of the flow flowing around the flow sensor.

Such thermal fluctuations in the environment of the fire detector are typically caused by the opening and closing of doors, by a gust of wind which strikes not entirely sealed windows from outside the building, by air turbulence caused by people, or by heaters, air conditioning systems, fans or blowers being switched on and off.

As described above, the output of the warning message is as it were suppressed for a period of time corresponding to the specified comparative value. It can then be assumed that the fire detector is not unacceptably contaminated if a surge of air with a slightly different air temperature compared to the temperature of the respective thermistor is detected from time to time within this period.

No electrical or power-intensive heating of the respective thermistor is necessary. As a result, the fire detector can also be an (exclusively) battery-powered fire detector. Its battery can be provided for the sole power supply of the fire detector. As a mass-produced product, the thermistors used, in particular the NTCs, are considerably more economical and more compact compared to dedicated flow sensors. In a fire detector featuring excess temperature capture these components can also be used as a further fire parameter. As a result, a fire detector incorporating teachings of the present disclosure needs fewer components compared to fire detectors with a hot-wire flow sensor as a flow sensor.

In contrast, thermal anemometers, such as a hot-wire anemometer, use a sensor element that has to be heated electrically and whose electrical resistance depends on the temperature or the cooling effect. A heat transfer takes place into the flow medium due to the flow around it, and this changes with the flow velocity. By measuring the electrical values, conclusions can then be drawn about the flow velocity. However, regardless of the high current and energy requirements, special electronics that regulate the heating current and amplify the sensor signal are additionally required for the operation of such sensors.

If the fire detector is an optical smoke detector, in particular a scattered light smoke detector, a (characteristic) fire parameter is the smoke density, which correlates metrologically with a scattered light level. The smoke density is monitored for exceeding a minimum smoke density, in other words metrologically a minimum scattered light level. In some embodiments, the smoke density or the corresponding scattered light level can also be monitored for an impermissibly fast increase.

If the fire detector is a thermal detector, a (characteristic) fire parameter is the temperature in the immediate environment of the fire detector, which is monitored for exceeding a minimum temperature. In some embodiments, the temperature can also be monitored for an impermissibly fast increase. In this case the control unit of the fire detector is configured to monitor the respective temperature measurement signal for exceeding an excess temperature limit value of in particular 54° C. and/or for exceeding a rate of temperature increase of in particular 5° C. per minute, or of 10° C. per minute, as fire parameters and to output a fire alarm if a fire is detected.

The fire detector can also be a combination of an optical smoke detector, in particular a scattered light smoke detector, and a thermal detector. In the simplest case a fire alarm is sounded as soon as one of the captured fire parameters exceeds an assigned comparative value.

In some embodiments, the control unit of the fire detector is processor-controlled and may be a microcontroller. The processor unit of such a microcontroller executes a software program which analyzes and evaluates the at least one captured fire parameter and outputs a fire alarm if a fire is detected, and which outputs the warning message in the absence of thermal fluctuations for the specified minimum length of time.

In some embodiments, the fire detector is a point detector. It can be connected to a signal line of a fire alarm control panel typically having multiple further fire detectors. In some embodiments, the fire detector can be battery-powered.

In some embodiments, the control unit is configured to continuously convert the respective temperature measurement signal by means of an A/D converter with a specified sampling interval AP into a respective digital temperature measurement signal, in particular with a sampling interval AP in a range of between 0.1 and 10 seconds, or in a range of between 0.5 and 2 seconds. As a result, the typically brief, sporadic occurrence of moving air with thermal inhomogeneities can be reliably detected. The actual A/D conversion time by means of an A/D converter in a microcontroller is usually less than 10 microseconds, in particular less than 2 microseconds.

In some embodiments, the control unit is configured to filter the respective captured temperature measurement signal initially by means of a high-pass filter and then to detect the signal fluctuations in the respective temperature measurement signal. The cut-off frequency, i.e. the filter frequency, of the high-pass filter is in particular less than 0.1 Hz. As a result, the DC signal component in the respective temperature measurement signal is removed for the improved metrological evaluation of the fluctuating AC signal component. The respective resulting high-pass filter signal is thus decoupled from the DC component. The high-pass filter can be an RC element realized with discrete components, which is connected downstream of the respective thermistor on the output side or downstream of a signal amplifier connected downstream of the thermistor on the output side. The aforementioned discrete components can also be already integrated into the control unit. In some embodiments, the high-pass filter is a digital high-pass filter.

In some embodiments, the control unit is configured to filter the respective captured temperature measurement signal initially by means of a high-pass filter, to filter a high-pass filter signal output by the respective high-pass filter by means of a low-pass filter with a filter time in the range of between 1 and 120 minutes, or of between 15 and 60 minutes, and to output it as a respective filter output signal. The cut-off frequency, i.e. the filter frequency, of the high-pass filter is in particular less than 1 Hz, or less than 0.1 Hz. The control unit is configured to output the warning message if at least one filter output signal, or all filter output signals, falls below a specified limit value of 5 mK, in particular 3 mK, or 1.5 mK, instead of the signal bandwidth of the signal fluctuations in the respective temperature measurement signal, for a minimum length of time. As a result, a more precise evaluation of the temperature measurement signals for the presence of signal fluctuations is possible.

In some embodiments, the control unit is configured to filter the respective captured temperature measurement signal initially by means of a high-pass filter, to filter a high-pass filter signal output by the respective high-pass filter by means of a moving mean value filter, in particular by means of a moving mean square or mean arithmetic value filter, with a specified filter time in the range of between 1 to 120 minutes, or of between 15 to 60 minutes, and to output it as a respective filter output signal. The cut-off frequency, i.e. the filter frequency, of the high-pass filter is in particular less than 1 Hz, preferably less than 0.1 Hz. In technical language such a filter is also referred to as a moving average filter. Another name for the mean square value filter is the effective value filter, which in technical language is also referred to as an RMS filter (Root Mean Square filter).

The control unit is configured to output the warning message if at least one filter output signal, or all filter output signals, falls below a specified limit value of 5 mK, in particular 3 mK, or 1.5 mK, instead of the signal bandwidth of the signal fluctuations in the respective temperature measurement signal, for a minimum length of time. If the moving mean value filter is a moving mean square value filter, in other words a moving effective value filter or a moving RMS filter, a particularly precise evaluation of the temperature measurement signals for the presence of thermal fluctuations is possible due to the signal-power-related metrological consideration.

The aforementioned high-pass, low-pass, and moving mean value filters are in particular digital filters, or stable FIR (Finite Impulse Response) filters, which are executed as part of a software program on a microcontroller as control unit. The simplest FIR filter is the classic averaging by summing individual consecutive values and dividing by their number. If this is not done in blocks (number 1 to number 10, number 11 to number 20, etc.), but in an overlapping manner (number 1 to number 10, number 2 to number 11, number 3 to number 12, etc.), the moving mean arithmetic value is obtained. In some embodiments, a FIR filter is averaging by summing the squares of individual consecutive values and dividing by their number with subsequent root formation. If this in turn is not done block by block, but again in an overlapping manner, the moving mean square value (moving RMS) is obtained.

In some embodiments, the specified limit value is set in a range of between 1.5 and 10 times, in particular between 1.5 and 5 times, of a reference value that was metrologically determined on a new, like-new or refurbished, in particular brand-new fire detector, in a flow-free test environment. The metrological determination typically takes place at a room temperature of 20° C.±2° C. and typically at normal ambient air pressure. The reference value essentially corresponds to the thermal noise or the thermal noise power.

In some embodiments, the control unit is configured to continuously convert the respective temperature measurement signal by means of the A/D converter into the respective oversampled digital temperature measurement signal using a number OVS of oversamplings in a range of between 2 and 4096, in particular with a number OVS of 64, 256, or 1024. In this case the total time of the oversamplings per conversion of a temperature measurement signal into an averaged digital value is less than 50 ms, in particular less than 25 ms, or less than 10 ms.

Oversampling arithmetically increases the resolution in an A/D conversion. The number of "extra" bits in this case follows the relationship 0.5×ld OVS, wherein ld is the dual logarithm and OVS is the number of oversamplings. With a number of 256 oversamplings, the resolution thus increases by 4 bits for each converted digital value.

Instead of an expensive microcontroller with a 14-bit A/D converter or a 16-bit A/D converter a less expensive microcontroller with a 10-bit A/D converter or a 12-bit A/D converter can now be used. Furthermore, an additional signal amplification circuit can be omitted. By increasing the resolution for each converted digital value by for example 4 bits, even the smallest temperature variations in the respective temperature measurement signal can be reliably resolved from the thermal noise of the thermistor.

In some embodiments, the control unit is configured to control the respective thermistor such that it heats up by less than 0.5 mk, in particular by less than 0.1 mK, per measured value captured. As a result, the respective thermistor is effectively operated passively with a negligible temperature increase.

In some embodiments, the control unit is configured to control the respective thermistor such that it takes up a maximum electrical energy of 10 μJ, in particular 5 μJ, or 0.5 μJ, per measured value captured. In this case too, the respective thermistor is effectively operated passively with a negligible temperature increase.

In some embodiments, the thermal capacity of the respective thermistor is dimensioned such that a maximum thermal response time of the respective thermistor is 3 s, in particular 2 s, or 1 s. The "thermal response time" means the time span in which the thermistor detects half of this temperature difference when an abrupt temperature difference is applied externally. As a result, even the slightest temperature fluctuations and thus thermal inhomogeneities within the moving air that reaches the region of an inlet opening or the central interior of the measuring chamber can be detected.

In some embodiments, a fire detection unit, in particular an optical measurement chamber, communicating with the ambient air via the at least one inlet opening, for capturing the at least one fire parameter is accommodated or configured in the housing. A grille, in particular an insect protection grille, is arranged in the region of the respective inlet opening and the fire detection unit.

In some embodiments, the grille is arranged between the at least one thermistor and the fire detection unit in the region of the respective inlet opening. In particular, the at least one thermistor is arranged radially outside the grille in relation to the main axis of the fire detector. Viewed from the outside, the respective thermistor is located "in front of" the grille. In some embodiments, at least two thermistors are arranged evenly distributed in the circumferential direction to the main axis of the fire detector. As a result, particularly reliable monitoring of whether the at least one inlet opening is impermissibly covered is possible.

In some embodiments, the at least one thermistor is arranged between the grille and the fire detection unit in the region of the respective inlet opening. Compared to the above configuration, the at least one thermistor is arranged radially inside the grille in respect of the main axis of the fire detector. Viewed from outside, the respective thermistor is located "behind" the grille. In some embodiments, the at least two thermistors are arranged evenly distributed in the circumferential direction to the main axis of the fire detector. When there is an even number of thermistors, these are arranged radially opposite in respect of the main axis. As a result, monitoring of the part of the grille assigned to the respective inlet opening for increasing and ultimately impermissibly high contamination is possible. In addition, monitoring of whether the at least one inlet opening is impermissibly covered is also possible.

In some embodiments, the control unit is configured to start an operating timer of the fire detector when the electrical power supply of the fire detector commences. The control unit is configured to output a Covered message, or the warning message together with a Covered message, as an indicator of whether the at least one inlet opening is impermissibly covered, if the signal bandwidth of signal fluctuations in at least one of the captured temperature measurement signals, preferably in all the temperature measurement signals, in a range of between 1 hour and 3 days, preferably of between 1 hour and 24 hours, falls below a value of 30 mK, in particular 20 mK, or 15 mK, for a minimum waiting time, and if furthermore an operating life measured value of the operating timer is less than 2 years, or less than 1 year.

In some embodiments, the operating timer can be a counter function block with a non-volatile electronic memory, such as for example an EEPROM, Flash, or FRAM memory. The operating timer can be a separate electronic component or can already be integrated into the control unit.

A fire detector is typically supplied with electrical power via a detector cable or via a detector bus by a fire alarm control panel when it is inserted into its detector base. In the case of a battery-operated fire detector, the supply of electrical power takes place when a battery of the fire detector is inserted or switched on.

It can be assumed here that a fire detector with a short operating life can scarcely have any contamination in the region of the inlet openings such that smoke or combustion gas to be detected is prevented from flowing through the inlet opening into the interior of the fire detector for fire detection. One reason for the absence of fluctuations is then highly probably that the inlet openings have been covered with a protective cap or, in the absence of such a cap, have been taped over with an adhesive tape to prevent the fire detectors from being painted over during forthcoming painting work. The Covered message or the warning message with the Covered message is output after a fire detector has been placed back into its detector base or when a fire detection system containing a plurality of fire detectors is switched back on, in order to draw attention to the possible non-operational readiness of a fire detector.

In some embodiments, the control unit is configured to output the warning message and/or the Covered message optically and/or acoustically directly at the fire detector, for example by means of a flashing LED or a buzzer. In some embodiments, the warning message and/or the Covered message can be output to a higher-level control panel connected to the fire detector and/or wirelessly to a higher-level control panel via a radio connection.

Some embodiments include a method for detecting contamination or whether at least one inlet opening for smoke or combustion gas is impermissibly covered. In this case at least one (unheated) thermistor is arranged in the region of one of the inlet openings. A temperature measurement signal is captured by the respective thermistor. A timer is started if in at least one of the temperature measurement signals thermal fluctuations are detected with a signal bandwidth of at least 30 mK, in particular at least 20 mK, or at least 15 mK. Finally, a warning message is output in the absence of moving ambient air around the respective thermistor, if the (average) signal bandwidth of signal fluctuations in at least one of the captured temperature measurement signals, or in all the temperature measurement signals, falls below a value of 30 mK, in particular 20 mK, preferably 15 mK, for a minimum length of time. In this case at least 90% of the captured signal fluctuations, or at least 95% of the captured signal fluctuations, fall within this signal bandwidth. The minimum time lies in a range of between 1 day and 1 year, in particular in a range of between 1 day and 1 month, and or in a range of between 1 day and 1 week.

For the avoidance of unnecessary repetitions, features and details described in the further description in connection with the aforementioned fire detector thereof also apply in connection with and in respect of the corresponding method and vice versa, so that, with regard to the disclosure, the individual aspects are or can always be referred to reciprocally.

The features and details described for the inventive fire detector, in particular scattered light smoke detectors, such as for example forms of embodiment of thermistors, numerical values, temperature values, durations, change rates, etc., apply likewise for the corresponding method.

FIG. 1 shows an example fire detector M incorporating teachings of the present disclosure with four thermistors T1-T4 arranged in a distributed manner in the region of the inlet opening OF. G designates a housing of the fire detector M, which comprises a base body GG and a hood H. Lying in between this, the fire detector M has by way of example an inlet opening OF entirely surrounding a main axis A of the fire detector M. The thermistors T1-T4 shown are part of a sensor system for capturing a flow in the region of the sensor system.

The hood H shown is by way of example supported by a measuring chamber housed in the interior of the housing G and communicating with the ambient air via at least one inlet opening OF. The optical measuring chamber MK may be referred to as a labyrinth. It characteristically has slats, not further shown. These are designed on the one hand to protect the optical measuring chamber MK from ambient light penetrating via the inlet opening OF and on the other hand to be permeable for smoke to be detected or for combustion gases to be detected.

N designates an insect grille, which prevents any penetration of insects and suchlike via the inlet opening OF into the interior of the measuring chamber MK. In this case the four thermistors T1-T4 are arranged radially outside the grille N in respect of the main axis A. The grille N is therefore located between the thermistors T1-T4 and the slats of the optical measuring chamber MK. If the inlet opening OF is now for example covered by a protective hood, the thermistors T1-T4 are then protected in fluidic terms against the ambient room air.

In the present example, the optical measuring chamber MK has, in a known fashion, two light-emitting diodes LED of different colors, each of which is arranged in a scattered light arrangement to form a photosensor PD. A further sensor, e.g. for detecting toxic gases such as carbon monoxide (CO), or for example a humidity sensor as a comfort sensor, can also be arranged in the measuring chamber MK.

All the above-mentioned sensors as well as the light-emitting diode LED can be arranged together with an electronic, processor-based control unit MC of the fire detector M on a printed circuit board PCB of the fire detector M. In some embodiments, the control unit MC of the fire detector M includes a microcontroller configured or programmed to output an alarm AL in the event of a fire being detected, symbolized by an arrow. In the present case, the alarm is sounded if an excessively high scattered light level or an excessively high CO level of a CO sensor was detected in the measuring chamber MK.

Figure 2:
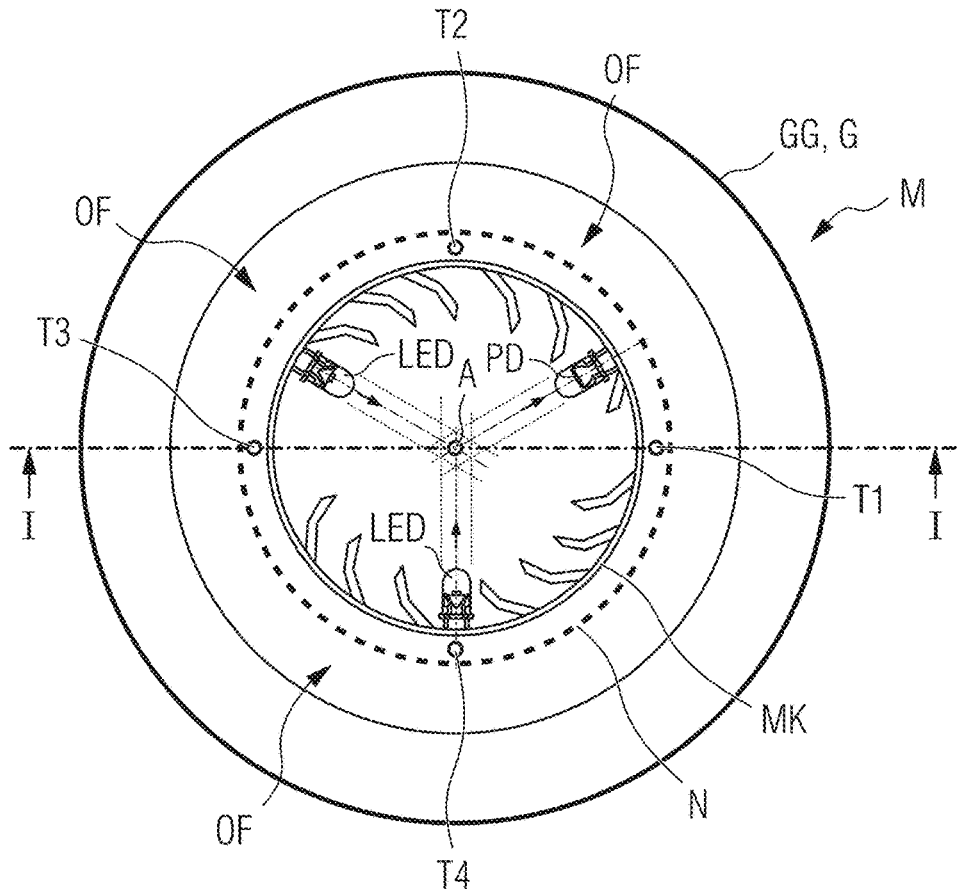
FIG. 2 shows a plan view of the fire detector in accordance with the direction of view II drawn in FIG. 1.

According to the example in FIG. 1 and FIG. 2, the four thermistors T1-T4, which are located radially outside in relation to the main axis A of the fire detector M, are arranged evenly distributed in the circumferential direction. The thermistors T1-T4 are preferably NTCs. These are extremely robust, very small in terms of dimensions and furthermore are inexpensive. Such NTCs have—apart from the connection wires—maximum dimensions in their three dimensions in the range of between 1 mm and 5 mm. Two of the three dimensions are typically even less than 2 mm. This extremely compact construction with its small thermal capacity guarantees a fast thermal response behavior of a maximum of 3 s, in particular a maximum of 2 s, or a maximum of 1 s. Short-term minor temperature fluctuations in the moving ambient air (thermal fluctuations) are then also reflected at the two electrical connections of the respective NTC in the form of corresponding ohmic changes be resistance that can metrologically tapped and thus also in an associated electrical temperature measurement signal. The aforementioned thermistors T1-T4 are thus configured or intended to output a respective temperature measurement signal.

The NTC for the respective thermistors T1-T4 can for example have an ohmic resistance value of 10 kΩ, 20 kΩ, 25 kΩ, 50 kΩ or 100 kΩ specified for an ambient temperature of 25° C. The respective NTC is typically connected in series to a resistor (component), which has a constant resistance value. The ohmic resistance value of the resistor (component) preferably corresponds to the resistance value of the respective NTC at 25° C. This series connection is connected to a constant voltage difference, for example to a voltage difference of 3.0 V, typically formed from the voltage difference between a reference potential (ground) and a positive constant supply voltage. The center tap of the series connection is then fed to an input of an A/D converter. The latter is normally already integrated into a microcontroller MC. The electronic control unit or the microcontroller MC is preferably configured or programmed to switch on this voltage difference only for the duration of a (forthcoming) A/D conversion. This can be done for example by electrical control of a switching element, such as for example a transistor, connected in series to this series connection. As a result, the power consumption is further minimized.

In some embodiments, instead of the ohmic resistor (component) a constant power source can be connected in series to the NTC or generally to the thermistor. In some embodiments, a signal amplifier, whose output signal is connected to the input of the A/D converter, can also be connected between the center tap of the series connection.

In some embodiments, the control unit MC shown is configured or programmed to output a warning message WM if the (average) signal bandwidth of signal fluctuations in at least one of the captured temperature measurement signals, or in all the temperature measurement signals S1-S4, falls below a value of 30 mK, in particular 20 mK, or 15 mK, for a minimum length of time MZ. The minimum time MZ lies in particular in a range of between 1 day and 1 year, in particular in a range of between 1 day and 1 month, and or in a range of between 1 day and 1 week.

Figure 3:
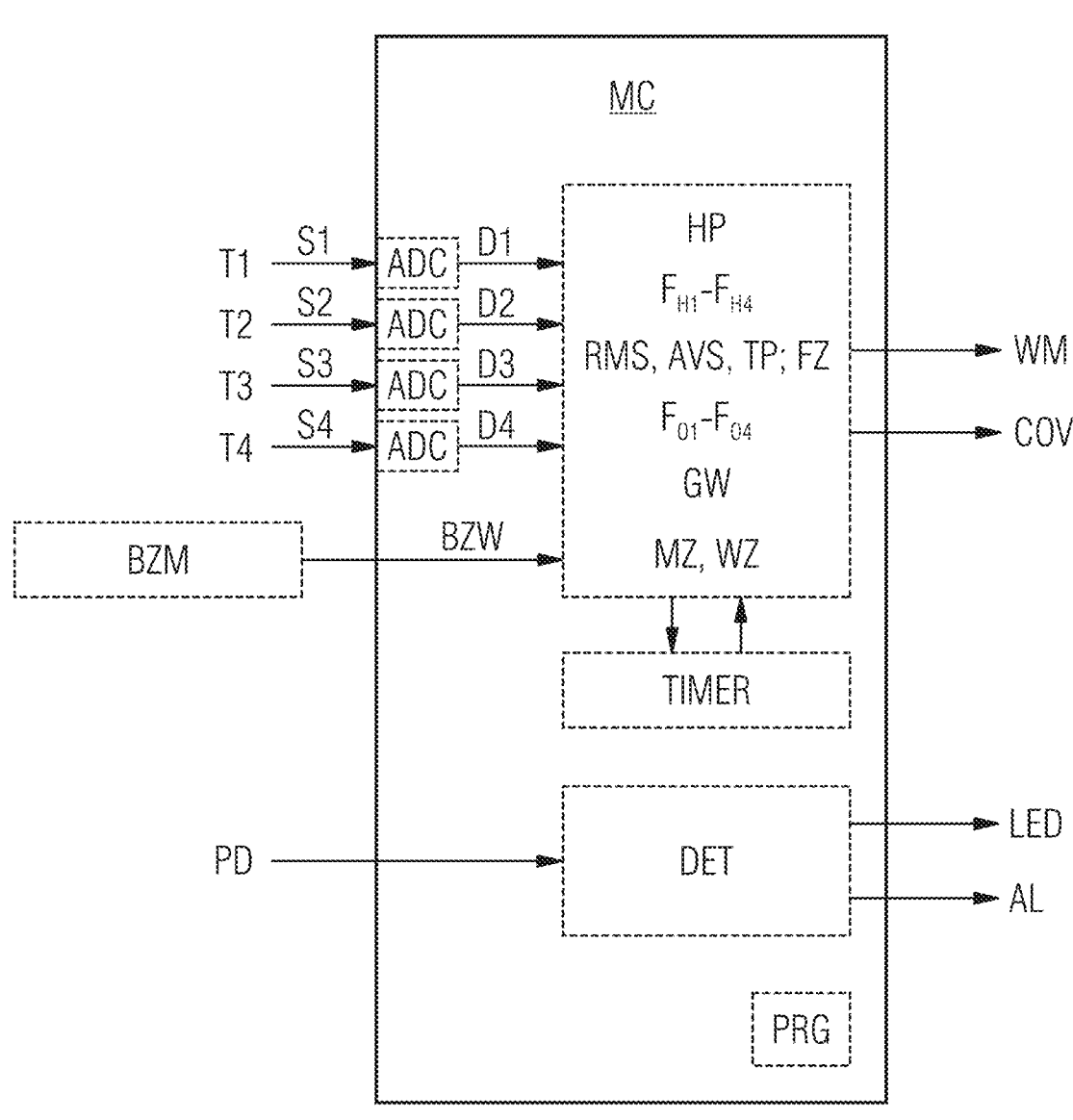
FIG. 3 shows a block diagram of an example electronic control unit incorporating teachings of the present disclosure.

FIG. 3 shows a block diagram of an electronic control unit MC of a fire detector M incorporating teachings of the present disclosure, realized as a microcontroller. A software program PRG is executed on the microcontroller MC by its processor unit to control the associated light-emitting diode LED in the case of a connected optical fire detection unit, to receive a sensor signal from the associated photodiode PD, and to analyze this by means of an evaluation program and if necessary to output a fire alarm AL. The software program PRG is furthermore executed in order to output a warning message WM in the absence of moving ambient air around the at least one thermistor T1-T4. The absence of thermal fluctuations is in this case an indicator of impermissibly high contamination or a blockage of the at least one inlet opening.

As FIG. 3 shows, the microcontroller MC to this end has by way of example four already integrated A/D converters ADC, which convert the temperature measurement signals S1-S4 originating from the four thermistors T1-T4 into a respective digital temperature measurement signal D1-D4. The four digital signals D1-D4 are filtered or converted in a function block (not referred to in greater detail) into a respective high-pass signal $F_{H1}$-$F_{H4}$ by means of a respective high-pass filter HP. In the present example the four high-pass signals $F_{H1}$-$F_{H4}$ are then preferably fed to a respective moving mean square value filter RMS. The filter output signals $F_{O1}$-$F_{O4}$ provided on the output side are then in accordance with the invention monitored to see whether at least one of the filter output signals $F_{O1}$-$F_{O4}$ exceeds a specified limit value GW. If this is the case, the counter value of a timer TIMER realized as software in the microcontroller MC is set to a start counter value corresponding to the minimum time and is started to count down. In this case the timer TIMER is reset or restarted with the start counter value each time if at least one of the filter output signals $F_{O1}$-$F_{O4}$ exceeds the specified limit value GW again. Finally, the warning message WM for the absence of moving ambient air around the at least one thermistor T1-T4 is output if the timer TIMER reaches the counter value zero.

In some embodiments, the four high-pass signals $F_{H1}$-$F_{H4}$ can also be fed to a respective moving mean arithmetic value filter AVS or a low-pass filter TP. The above-described filters HP, RMS, AVS, TP are digital filters, or FIR filters. FZ designates a filter time for the moving mean value filters RMS, AVS or for the low-pass filter TP.

In some embodiments, the control unit MC can be connected to an operating timer BZM, which is started when the electrical power supply of the fire detector commences. The control unit MC is in this case configured or programmed (PRG) to output a Covered message COV, or the warning message WM together with a Covered message COV, as an indicator of whether the at least one inlet opening is impermissibly covered, if the signal bandwidth of signal fluctuations in at least one of the captured temperature measurement signals, or in all the temperature measurement signals S1-S4, falls below a value of 30 mK, in particular 20 mK, preferably 15 mK, for a minimum waiting time WZ in a range of between 1 hour and 3 days, or between 1 hour and 24 hours, and if furthermore an operating life measured value BZW of the operating timer BZM is less than 2 years, or less than 1 year.

Figure 4:
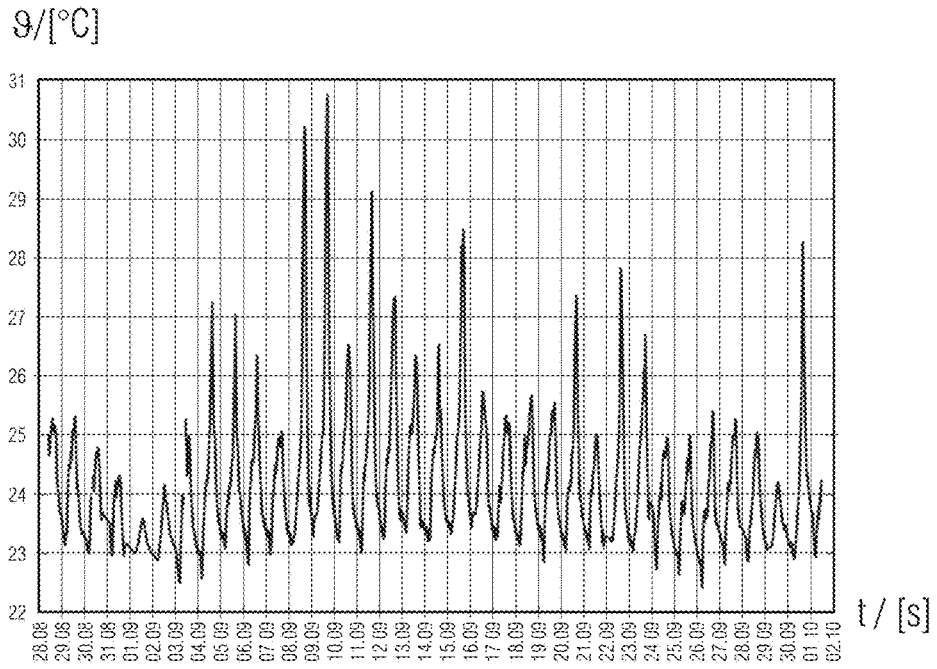
FIG. 4 shows the characteristic of an unfiltered temperature measurement signal of a thermistor, arranged in the region of an inlet opening of an example fire detector incorporating teachings of the present disclosure.

FIG. 4 shows the characteristic of an unfiltered temperature measurement signal of a thermistor, arranged in the region of an inlet opening of an example fire detector incorporating teachings of the present disclosure. The temperature measurement signal was sampled by way of example with a sampling time of 2 seconds and was plotted over a period of somewhat more than a month (August 28 to October 2) in a non-air-conditioned room in the applicant's development department. In this case, the temperature measurement signal reflects the characteristic of the ambient temperature with the respective maximum temperatures during the day and the respective minimum temperatures at night. The maximum temperature range for this period was approx. 8 degrees Celsius.

Figure 5:
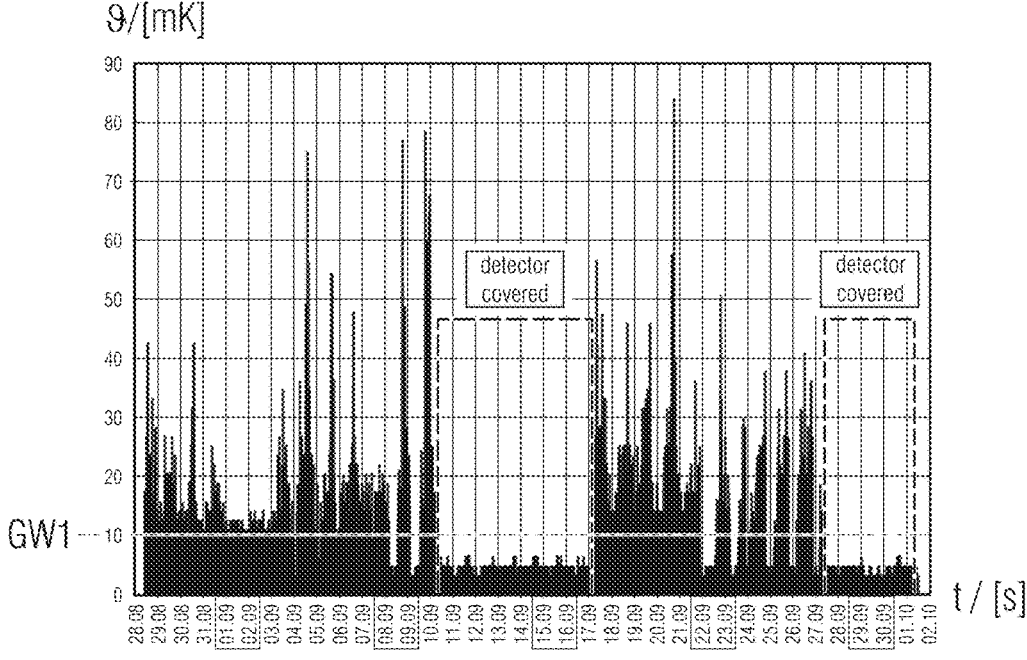
FIG. 5 shows the characteristic of the absolute value of a high-pass filter signal after filtering of the unfiltered temperature measurement signal from FIG. 4 in an enlarged view.

FIG. 5 shows the characteristic of the absolute value of a high-pass filter signal after filtering of the unfiltered temperature measurement signal from FIG. 4 in an enlarged view. The high-pass filter used to decouple the DC component in the temperature measurement signal had a filter time of 25 seconds, corresponding to a filter frequency of ¹⁄₂₅ of a second. Metrologically greatly enlarged, comparatively large signal deflections in the form of signal fluctuations with absolute maximum deflections of approx. 80 mK, which are associated with thermal fluctuations in the ambient air, can be seen up to the point at which the protective hood is fitted (see the two boxes labeled "Detector covered"). In this case, these thermal fluctuations as it were flow around the direct environment around the measured thermistor.

Surprisingly, these signal deflections decrease very quickly when the protective hood is fitted. The reason for this is the shielding effect of the protective hood. In the further characteristic the absolute value of the filtered temperature measurement signal indicates signal fluctuations with maximum deflections of approx. 6 mK, corresponding to a signal bandwidth with double the value of approx. 12 mK, and is thus lower by approximately one order of magnitude than in the period before the inlet opening is covered by the protective hood. The high-pass filtering with the absolute temperature differences shown means that the temperature measurement signal remains above the zero line and related to the zero line. The reference character B/2 designates half the signal bandwidth of the signal fluctuations in the period when the detector is covered.

Figure 6:
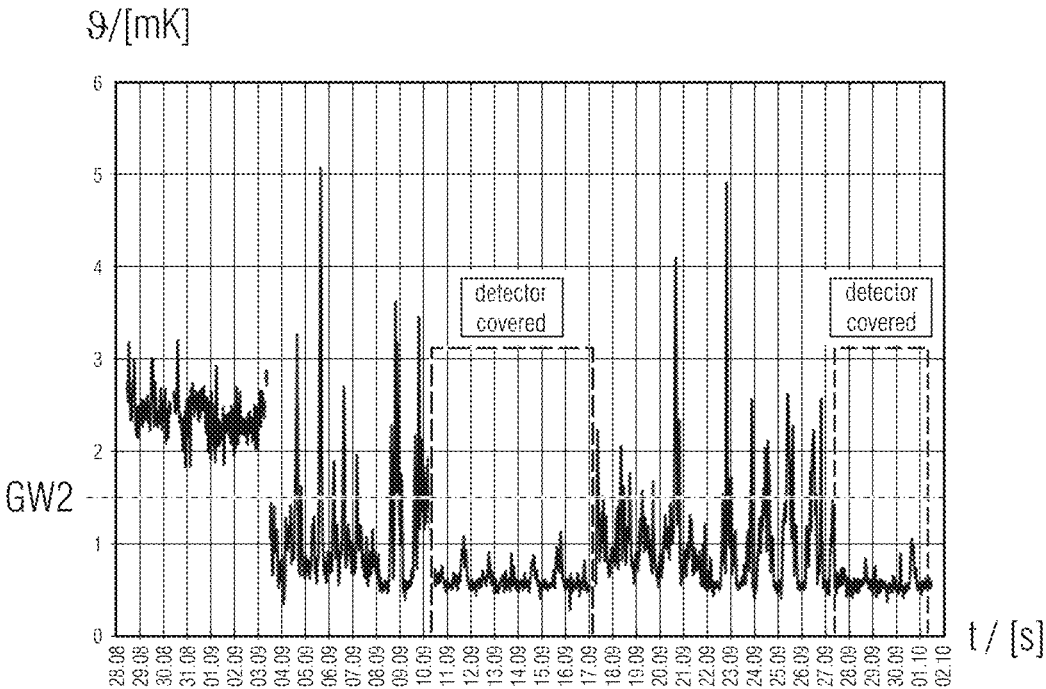
FIG. 6 shows the characteristic of the absolute value of a filter output signal after filtering of the high-pass filter signal from FIG. 5 by means of a low-pass in a greatly enlarged view.

Finally, FIG. 6 shows the characteristic of the absolute value of a filter output signal after filtering of the high-pass filter signal from FIG. 5 by means of a low-pass filter with a filter time of 60 minutes in a greatly enlarged view. As FIG. 6 shows, the absolute values of the low-pass signal of approx. 5 mK before the protective cap is fitted decrease dramatically to a value of approx. 1 mK after the protective cap is fitted. The reference character GW registers a limit value with a specimen value of 1.5 mK, which is reliably not exceeded by the absolute values of the low-pass filter signal in the period in which the detector is covered. This very large and stably reproducible signal difference makes it possible to discriminate reliably whether inlet openings have been covered or are completely contaminated.

LIST OF REFERENCE CHARACTERS

A Main axis, axis of symmetry
ADC A/D converter
AL Fire alarm, alarm
AVS Moving mean arithmetic value filter
B/2 Half the signal bandwidth
BZM Operating timer
BZW Operating life measured value
COV Covered message
DET Evaluation unit
D1-D4 Digital temperature measurement signal
$F_{H1}$-$F_{H4}$ High-pass filter signal
$F_{O1}$-$F_{O4}$ Filter output signals
FZ Filter time
GG Base body
GW Limit value
H Hood, detector hood
HP High-pass filter
LED Light emitter, light-emitting diode
M Fire detector, smoke detector
MC Electronic control unit, microcontroller
MK Fire detection unit, optical measuring chamber
MZ Minimum time
N Insect grille, net
OF Inlet opening, smoke inlet opening
PCB Printed circuit board
PD Light receiver, photodiode
PRG Computer program, software
RMS Moving mean square value filter
S1-S4 Temperature measurement signal
t Time, time axis
T1-T4 Thermistor, NTC
TIMER Timer, timer element
TP Low-pass filter
WM Warning message, contamination message
WZ Minimum waiting time
$\Delta\vartheta$ Temperature change
$\vartheta$ Temperature

What is claimed is:
1. A fire detector for monitoring a fire parameter and generating a fire alarm if a fire is detected, the fire detector comprising:
a housing with an inlet opening;

a sensor system communicating via the inlet opening with ambient air to capture a flow in a region of the sensor system; and a control unit connected to the sensor system to evaluate operational capability of the fire detector;

wherein the sensor system includes a thermistor arranged adjacent the inlet opening;

the control unit is connected to the thermistor to capture a respective temperature measurement signal; and the control unit generates a warning message if the signal bandwidth of signal fluctuations of the captured temperature measurement signal falls below a value of 30 mK for a minimum length of time.

2. The fire detector as claimed in claim 1, wherein the minimum time lies in a range of between 1 day and 1 year.

3. The fire detector as claimed in claim 1, wherein the control unit is configured to:

start an operating timer when the electrical power supply of the fire detector commences; and put out a Covered message or the warning message together with a Covered message as an indicator that the inlet opening impermissibly covered, if the signal bandwidth of signal fluctuations of the captured temperature measurement signals falls below a value of 30 mK in a range of between 1 hour and 3 days for a minimum waiting time and if an operating life measured value of the operating timer is less than 2 years.

4. The fire detector as claimed in claim 1, wherein the control unit is configured to continuously convert the temperature measurement signal into a digital temperature measurement signal using an A/D converter with a specified sampling interval in a range of between 0.1 and 10 seconds.

5. The fire detector as claimed in claim 4, wherein the control unit is configured to continuously convert the temperature measurement signal into an oversampled digital temperature measurement signal using the A/D converter using a number of oversamplings in a range of between 2 and 4096.

6. The fire detector as claimed in claim 1, wherein the control unit is configured to filter the captured temperature measurement signal using a high-pass filter before detecting fluctuations in the temperature measurement signal.

7. The fire detector as claimed in claim 1, wherein the control unit is configured to:

filter the captured temperature measurement signal using a high-pass filter;

then filter a signal output by the high-pass filter using a low-pass filter with a filter time in the range of between 1 and 120 minutes;

generate output of the low-pass filter as a filter output signal; and put out the warning message if an absolute value of the filter output signal falls below a specified limit value for a minimum length of time instead of the signal bandwidth of the signal fluctuations in the temperature measurement signal.

8. The fire detector as claimed in claim 7, wherein the specified limit value is in a range of between 1.5 and 10 times of a reference value metrologically determined on a fire detector in a flow-free test environment.

9. The fire detector as claimed in claim 1, wherein the control unit is configured to:

filter the captured temperature measurement signal using a high-pass filter;

then filter a high-pass filter signal output from the high-pass filter using a moving mean value filter with a specified filter time in the range of between 1 and 120 minutes;

generated a respective filter output signal; and put out the warning message if an absolute value of the filter output signal falls below a specified limit value of 5 mK for a minimum length of time, instead of the average signal bandwidth of the signal fluctuations in the temperature measurement signal.

10. The fire detector as claimed in claim 1, wherein the control unit is configured to control the thermistor so:

it heats up by less than 0.5 mK per measured value captured, and/or it takes up a maximum electrical energy of 10 µJ per measured value captured.

11. The fire detector as claimed in claim 1, wherein the thermistor has a maximum thermal response time of 3 s.

12. The fire detector as claimed in claim 1, further comprising:

a fire detection unit communicating with the ambient air via the inlet opening for capturing the fire parameter; and a grille arranged adjacent the inlet opening and the fire detection unit;

wherein the grille is arranged between the thermistor and the fire detection unit; or wherein the thermistor is arranged between the grille and the fire detection unit.

13. The fire detector as claimed in claim 12, wherein the control unit is configured to put out the warning message and/or the Covered message optically and/or acoustically directly at the fire detector and/or to a higher-level control panel connected to the fire detector and/or wirelessly to a higher-level control panel via a radio connection.

14. The fire detector as claimed in claim 1, wherein the control unit is configured to monitor the temperature signal for exceeding an excess measurement temperature limit value of 0.54° C. and/or for exceeding a rate of temperature increase of 5° C. per minute as fire parameters.

15. A method for detecting contamination or whether an inlet opening for smoke or combustion gas in a fire detector is being impermissibly covered, the method comprising:

monitoring an unheated thermistor arranged in a region of the inlet opening;

capturing a temperature measurement signal by the respective thermistor; and putting out a warning message in response to an absence of moving ambient air around the thermistor if the signal bandwidth of signal fluctuations of the captured temperature measurement signal falls below a value of 30 mK for a minimum length of time.

* * * * *